Figure 1:
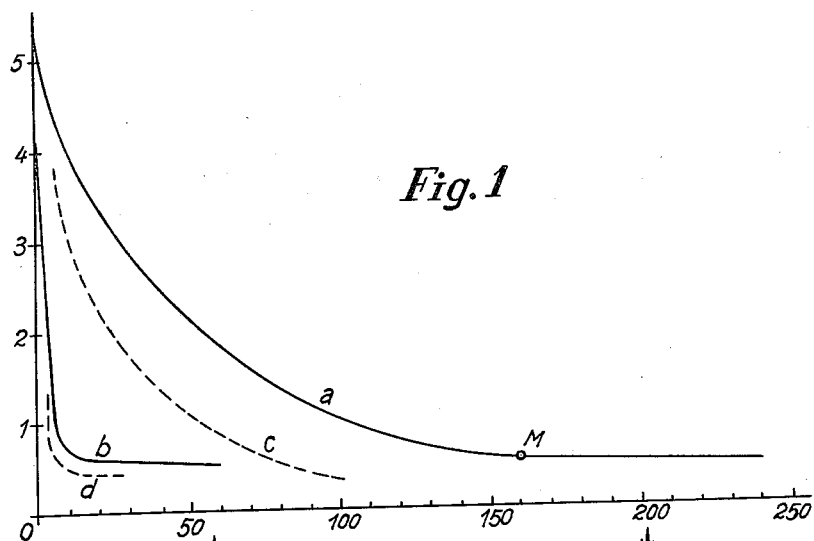

July 25, 1961  G. GIAMMARCO  2,993,750
METHOD OF SEPARATING CARBON DIOXIDE FROM GASEOUS MIXTURES
Filed June 17, 1955

United States Patent Office 2,993,750
Patented July 25, 1961

2,993,750
METHOD OF SEPARATING CARBON DIOXIDE FROM GASEOUS MIXTURES
Giuseppe Giammarco, Porto Marghera, Italy, assignor to S.p.A. Vetrocoke, Turin, Italy
Filed June 17, 1955, Ser. No. 516,277
Claims priority, application Italy June 21, 1954
5 Claims. (Cl. 23—2)

It is known that elimination of carbon dioxide from gaseous mixtures containing it by treatment with solutions of alkaline salts, such as carbonates, phosphates, borates, phenates of sodium, potassium and ammonium, solutions of amino alcohols such as ethanolamines and the like, is hindered by the fact that the rate of hydration of the carbon dioxide is generally low, or, in other words, in passing from a gaseous to a liquid phase and viceversa, the gaseous molecule of $CO_2$ is opposed a certain resistance which, as is well konwn, is mostly localised in the liquid film separating the two phases.

In industrial plants for eliminating $CO_2$ by means of the abovementioned absorbing solutions the above drawback led to the adoption of wide contact surfaces, hence large volumes both of the absorbing and regenerating apparatus. Moreover, the difficulty of expelling $CO_2$ from the liquid phase, which results in an incomplete regeneration of the absorbing solution, necessitates circulation through the plant of a larger liquid quantity which implies an increased power consumption, the final purification of the mixture being detrimentally affected.

In the past, in order to improve the operating conditions of the $CO_2$ eliminating plant, a larger number of researchers had investigated the influence of the addition of various substances, such as glycol, glycerine, lactose, dextrose, starch, sulphites, alcohols, triethanolamine, etc. to solutions of alkaline carbonates, but the results were of no or poor industrial importance.

In the process according to this invention, referring to the nitrogenous organic substances which in the living organism govern or anyhow take part to the physiological phenomenon through which carbon dioxide from the living cell is expelled to the outside through the respiratory apparatus, the abovementioned absorbing solutions are admixed with even moderate quantities of nitrogenous organic compounds of the class of protides and aminoacids, including nitrogenous organic compounds having the same or a similar chemical function, even if they are not of physiological origin, such as aminobenzoic, aminonaphthenic, aminophenolic acids, their derivatives and homologues.

Among the protides which have been successfully tested by applicant under physical and chemical conditions current in industrial processes, albumines, gelatines, animal glues, caseins, some blood compounds, etc. may be mentioned by way of example. Among aminoacids glycin, alanine, taurine, glutamic acid, proline and, among chemically similar substances, anthranylic acid were tested successfully.

It should be noted that addition to sodium carbonate solutions of gelatines and peptones, that is, substances of the same character as those claimed herein, was the object of special research work by P. Riou, L. Lortie (C.r. 186, 1543, 1929), who reported, contrarily to applicant, a negative effect.

The conclusion of Riou and Lortie's work is, however, related to the circumstance that their research was limited to the temperature of 20° and absorbing step only. In applicant's experiments which were carried out under conditions of operation of an industrial plant, that is, in the hot and in the presence of alkalis, the result was decidedly a positive one.

The addition of the substances of the class of protides and aminoacids, as specified above, enhances the absorbing and desorbing power of the solutions employed so that, though leaving to the alkaline compounds the task of governing the quantitative balance of the phenomenon, the rate of the latter is considerable increased.

It has been ascertained that the first small additions of the above substances are sufficient for considerably enhancing the absorbing and desorbing power of the solution employed; the successive additions give gradually decreasing effects, as will be specified hereafter with reference to FIGURE 1 of the drawing.

It was moreover found that the efficiency of the said addition is higher when absorption is carried out under pressure instead of at atmospheric pressure.

Special research work was carried out by applicant in the field of $CO_2$ absorption by means of solutions of alkaline carbonates activated by addition of aminoacids, because these substances are of well-defined chemical composition, and form in the end the protides themselves.

FIGURE 1 shows the results of tests carried out in an experimental plant comprising an absorbing tower and a regenerating apparatus operating in the hot in the known manner.

In the diagram shown in FIGURE 1, the abscissae are the quantities in grams/liter of the "glycin" aminoacid added to the absorbing solution, the $CO_2$ percentages at the outlet from the absorbing tower being plotted along the axis of the ordinates.

The curve "a" relates to washing at atmospheric pressure and 75° C. of a gaseous mixture having an initial 10% content of $CO_2$ by means of a solution of 170 g./l. sodium carbonate activated by means of gradual additions of glycin.

The curve "b" relates to washing at a pressure of 12 atm. at 75° C. of a gaseous mixture having an initial 25% content of $CO_2$ by means of a solution of 294 g./l. potassium carbonate in the presence of gradual additions of glycin.

The shape of curves "a" and "b" shows that the first additions of activating substances are most efficient, while the successive additions become gradually less efficient, till their effect is nil in the final asympthotic portion of the said curves.

It is noted that by operating under pressure (curve "b") the efficiency of the first additions is considerably higher than in operation at atmospheric pressure (curve "a").

It is further noted that the highest absorbing power is actually attained, more particularly when operating under pressure, with relatively moderate additions of activating substances.

This ascertainment is actually of great importance in respect of the use of aminoacids for absorption of $CO_2$ and other acid gases. In fact, they had been previously proposed for absorbing carbon dioxide in the process disclosed by British Patent 391,786.

In the latter process aminoacids were employed in quantities stoichiometrically corresponding to the alkali contained in the absorbing solution. Heavy corrosion, mentioned in the specification itself, was ascertained in respect of ferrous materials, which was the cause of the very low industrial interest aroused.

Applicant ascertained experimentally that the corrosive action of the solutions containing alkalis and aminoacids disappears when excess alkali is present equalling at least 1.5 times the stoichiometrically required quantity for forming the salt, these conditions occurring, for instance, at the point M of the curve "a."

It was further ascertained that the abovementioned corrosive action is obviated also when the alkali excess is bound to arsenious acid instead of to carbon dioxide, actually when an alkaline aresnite is added to a solution of alkaline salts of an aminoacid.

As distinct from the disclosure of British patent specification 391,786 the process according to this invention employs for the reasons explained above an absorbing solution containing an alkaline compound (carbonate or arsenite) and a quantity of aminoacid lower than the quantity required by the stoichiometric ratio in respect of the alkali in the solution. This avoids any risk of corrosion, though the absorbing efficiency is the same as that of a solution having an aminoacid content stoichiometrically correspondng to the alkali contents in the solution.

Accordingly, in curve "a" of FIGURE 1 the corrosion phenomenon occurs at a point M, that is, when the maximum absorbing power of the solution has been reached.

In the case of curve "b" relating to absorption under pressure, the maximum absorbing power is reached even sooner, that is, with an aminoacid content very far from the one at which the corrosion phenomenon starts.

Applicant ascertained the usefulness of additions of activating substances of the class of the protides and aminoacids also in the industrial field, for instance in a large plant for eliminating under pressure $CO_2$ from conversion gas for the $NH_3$ synthesis. It was ascertained in the said plant that an addition as low as 15 g./l. glycin to a mineral solution containing 200 g./l. $K_2O$ was capable of reducing at least to one-half the volume of the absorbing apparatus and also to one-half the quantity of absorbing liquid circulated.

A more favourable effect was obtained by employing a solution containing 200 g./l. $K_2O$ and 30 g./l. animal glue of current characteristics. The addition of the said glue is preferably effected by introducing it into a portion of the hot liquid at the end of the regeneration step and suitably purifying the said liquid from insolubles contained in the glue by filtering.

In elimination of carbon dioxide in plants operating at atmospheric pressure, mineral solutions containing a larger quantity of activating substances are conveniently employed; however, the said quantity should not exceed the degree of concentration beyond which corrosion occurs.

Activating substances covered by this invention can be used either alone or jointly. These substances are of a non-volatile nature, so that addition thereof to the mineral solution permits of using the latter in any cycle of known type both for eliminating carbon dioxide for production purposes and purifying gaseous mixtures from carbon dioxide.

In the latter case it is more particularly advantageous to employ a cycle in which regeneration is carried out by desorption at a temperature below the boiling point of the solutions employed by treatment in direct contact with air or other hot or previously heated and moistened gases as explained in the Example 1.

Applicant further ascertained that the addition of activating substances to absorbing solutions can be reduced, the effect being the same when further substances, referred to hereafter as synergistic substances, such as boric acid, inorganic and organic salts of zinc, selenium, tellurium, aluminum, trivalent arsenic, silicic acid and other substances with an analogous amphoteric behaviour are added.

These synergistic agents are operative even when they are present in minimum quantities consistently with the chemical composition of the gas and solution.

Under experimental conditions according to FIGURE 1, the addition of 5 g./l. boric acid to the absorbing solution causes curve "a" to take a modified shape shown in the dash-line curve "c," the curve "b" relating to absorption under pressure taking the form of the dash-line curve "d."

It may be inferred from these curves for instance that the addition of 5 grams boric acid acts so that in operation under pressure a solution containing 5 g./l. glycin and 5 g./l. boric acid is of the same absorbing power as a solution containing 15 g./l. glycin.

Now, it is known that aminoacids employed as such or deriving from the hydrolysis undergone by protides under the temperature conditions of the plant give rise during the operating cycle to losses by decomposition due to heat or the presence of oxygen.

These losses are proportional to the concentration of aminoacids in the absorbing solution. Consequently, by reducing the quantity of required activating aminoacid for a given absorbing efficiency the action of the above-defined synergistic agents results at the same time in a reduction in losses by decomposition and oxidation.

The above technical discoveries relating to the increase in absorbing power obtained by adding substances of the class of protides and aminoacids apply not only in the case of alkaline mineral solutions of the above defined type, but also when amino-alcohol solutions (ethanolamines) are employed.

In the pilot plant employed for the tests according to FIGURE 1 it was ascertained that by washing at room pressure and 40° C. a gas containing 10% $CO_2$ by means of an aqueous 20% solution of triethanolamine, the $CO_2$ content in the washed gas was 2% while, by washing under the same conditions the same gas by the same solution to which 15 g./l. glycin had been added, the $CO_2$ content in the washed gas sank to 0.8 to 1%.

Moreover, Applicant ascertained that, similarly to $CO_2$, absorption of $H_2S$ by washing by means of alkaline salts solutions of the type referred to above can be rendered more efficient by adding the above defined activating agents belonging to the class of protides and aminoacids.

For carrying out the said absorption alkaline solutions are advantageously employed to which an adequate quantity of activating amino-acid has been added to secure a suitable absorbing efficiency, though the addition is lower than the quantity which would determine, as previously stated with reference to $CO_2$, starting of corrosion in respect of iron, such corrosion seriously impairing the usefulness of the process for absorbing $H_2S$ by means of solutions containing alkalis and aminoacids in their proper stoichiometric ratio (Alkazid), that is, without the excess alkali covered by this invention.

British patent specifications 391,780 and 391,786 include the statement that the corrosion phenomenon no longer occurs if $H_2S$ or other sulfuretted compounds are contained in the treated gas. However, it was ascertained in industrial operation that the inhibiting action of $H_2S$ is insufficient, which entails the necessity to employ apparatus made of a metal other than iron, such as stainless steel, aluminum or other in order to avoid corrosion, more particularly at the regenerating section of the plant and anyhow at regions subjected to high temperatures.

Moreover, corrosion also occurs when the $H_2S$ percentage in the mixture to be purified is a low one.

This was ascertained by numerous authors, for instance N. N. Jegorov, M. M. Dmitriev, D. D. Sikov, "Desulphuration of Gases," Italian translation by Jacubson, Hoepli 1954, pages 204, 205 and 252.

In the process according to this invention $H_2S$ is conveniently absorbed by means of a solution containing alkalis and amino acids, the latter being in a quantity sufficient for affording a satisfactory absorbing efficiency, but lower than that at which corrosion starts.

Figure 2:
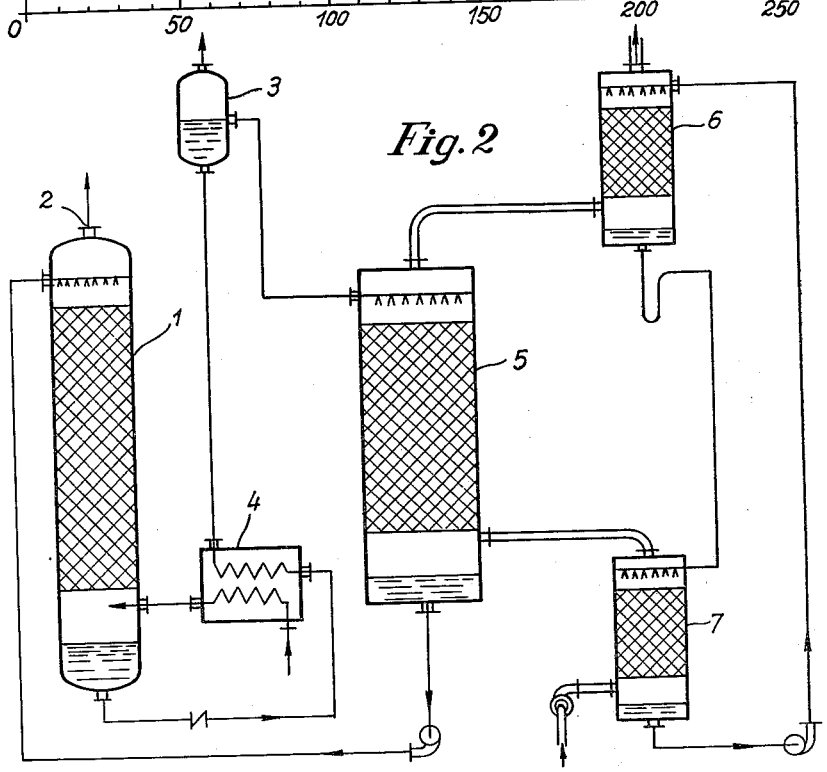

The above is illustrated by the following examples:

*Example 1.*—Referring to FIGURE 2 of the drawing a conversion gas containing 28% $CO_2$ is admitted from below at a pressure of 12 atm. into the absorbing tower 1, the said gas having previously heated in a heat exchanger 4 the exhausted absorbing liquid conveyed to regeneration.

The gas is treated in the tower 1 in countercurrent with a solution containing 200 g./l. $K_2O$ and 15 g./l. glycin at a temperature of 70-75° C. The gas leaves the tower 1 through the outlet 2 with a residual $CO_2$ content of 0.15-0.4%. It was ascertained that 1 cubic meter of this solution can absorb up to 25-30 cubic meters $CO_2$ without any solid deposits being formed during operation and even in the cold.

The exhausted solution is expanded from the tower 1, heated to 85-95° in the heat exchanger 4, transferred to the degasifier 3 adapted to collect in a pure condition part of the absorbed carbon dioxide, then to the top of the regenerating tower 5, where it is treated in counter-current with air moistened and heated in the tower 7 by means of water which has been heated in the tower 6 at the expense of the hot air from the tower 5.

The quantity of air employed for regeneration is adjusted so that the outlet temperature of the regenerated liquid is about 70-75° C., that is it equals the temperature selected for absorption.

*Example 2.*—In a large industrial plant comprising an absorbing tower operating under pressure and regenerating tower operating at atmospheric pressure, a conversion gas, compressed to 12 atm., containing 28% $CO_2$ is treated at a temperature of 55-60° C. with a solution of potassium carbonate at 200 g./l. $K_2O$ to which 5 g./l. glycin and 5 g./l. boric acid have been added. The gas leaves the absorbing tower with a residual $CO_2$ content of 0.2 to 0.4%.

It was found that under these conditions 1 cubic meter solution actually absorbs 25 to 30 cubic meters $CO_2$.

In the same plant with the use of a potassium carbonate solution containing 300 to 350 g./l. $K_2O$ and 40 g./l. hydrolised animal glue at a temperature of 80 to 85° C. on treating a gas containing 35% $CO_2$ about 35 Nm.³ $CO_2$/m.³ solution are absorbed.

*Example 3.*—A coke oven gas compressed to 12 atm. containing 2.5% $CO_2$ and 0.3% $H_2S$ is washed in a tower with a sodium carbonate solution containing 50 g./l. $Na_2O$ and 15 g./l. glycin. The gas leaving the tower is free from $H_2S$, the residual $CO_2$ content being 0.05%.

*Example 4.*—A gas containing 2% $CO_2$ and 0.8% $H_2S$ is washed at atmospheric pressure in a tower by a sodium carbonate solution containing 100 g./l. $Na_2O$ and 15 g./l. glycin. The gas leaving the tower has a residual $CO_2$ content of 0.8 to 1% and a residual $H_2S$ content of 0.05%. The apparatus is all-iron.

*Example 5.*—A gas containing 10% $CO_2$ is washed at atmospheric pressure in a tower by a sodium carbonate solution containing 50 g./l. $Na_2O$ and 70 g./l. glycin. The gas leaving the tower has a residual $CO_2$ content of 0.5%.

What I claim is:

1. A method of separating carbon dioxide from a gaseous mixture containing it in the amount of at least 2% which comprises the steps of absorbing the carbon dioxide in an alkaline solution by bringing said gaseous mixture into contact with said solution, said solution containing an absorption promoter selected from the group consisting of protides and amino acids, said promoter being present in a quantity such that the total alkalinity of said solution is at least 1.5 times that required stoichiometrically to combine with said promoter whereby the solution is not corrosive to metals and decomposition is suppressed, and regenerating the solution after contact with said aqueous mixture by expelling therefrom the carbon dioxide.

2. A method of separating carbon dioxide from a gaseous mixture containing it in the amount of at least about 2% which comprises the steps of absorbing the carbon dioxide in a solution of alkaline inorganic salts by bringing said gaseous mixture into contact with said solution, said solution containing an absorption promoter selected from the group consisting of protides and amino acids, said promoter being present in a quantity such that the total alkalinity of said solution is at least 1.5 times that required stoichiometrically to combine with said promoter whereby the solution is not corrosive to metals and decomposition is suppressed, and regenerating the solution after contact with said aqueous mixture by expelling therefrom the carbon dioxide.

3. A method of separating carbon dioxide from a gaseous mixture containing it which comprises the steps of absorbing the carbon dioxide in an aminoalcohol solution by bringing said gaseous mixture into contact with said solution, said solution containing an absorption promoter selected from the group consisting of protides and amino acids, said promoter being present in a quantity such that the total alkalinity of said solution is at least 1.5 times that required stoichiometrically to combine with said promoter whereby the solution is not corrosive to metals and decomposition is suppressed, and regenerating the solution after contact with said aqueous mixture by expelling therefrom the carbon dioxide.

4. A method of separating carbon dioxide from a gaseous mixture containing it in the amount of at least about 2% which comprises the steps of absorbing the carbon dioxide in an alkaline solution by bringing said gaseous mixture into contact with said solution, said solution containing an absorption promoter selected from the group consisting of protides and amino acids, said promoter being present in a quantity such that the total alkalinity of said solution is at least 1.5 times that required stoichiometrically to combine with said promoter, whereby the solution is not corrosive to metals and decomposition is suppressed, said solution further including boric acid, and regenerating the solution after contact with said aqueous mixture by expelling therefrom the carbon dioxide.

5. A method of separating carbon dioxide from a gaseous mixture containing it in the amount of at least about 2% which comprises the steps of absorbing the carbon dioxide in an alkaline solution by bringing said gaseous mixture into contact with said solution, said solution containing an absorption promoter selected from the group consisting of protides and amino acids, said promoter being present in a quantity such that the total alkalinity of said solution is at least 1.5 times that required stoichiometrically to combine with said promoter whereby the solution is not corrosive to metals and decomposition is suppressed, and regenerating the solution after contact with said aqueous mixture by expelling therefrom the carbon dioxide by means of a stream of air at a temperature below the boiling point of said solution.

References Cited in the file of this patent

UNITED STATES PATENTS

| | | |
|---|---|---|
| 1,990,217 | Baehr et al. | Feb. 5, 1935 |
| 2,031,632 | Bottoms | Feb. 25, 1936 |

FOREIGN PATENTS

| | | |
|---|---|---|
| 391,780 | Great Britain | May 1, 1933 |
| 391,786 | Great Britain | May 1, 1933 |